(12) United States Patent
Gutierrez (10) Patent No.: US 10,318,344 B2
(45) Date of Patent: Jun. 11, 2019

(54) PREDICTING PAGE MIGRATION GRANULARITY FOR HETEROGENEOUS MEMORY SYSTEMS

(71) Applicant: Advanced Micro Devices, Inc., Sunnyvale, CA (US)

(72) Inventor: Anthony Thomas Gutierrez, Seattle, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/649,312

(22) Filed: Jul. 13, 2017

(65) Prior Publication Data

US 2019/0018705 A1     Jan. 17, 2019

(51) Int. Cl.
*G06F 12/00* (2006.01)
*G06F 9/48* (2006.01)
(Continued)

(52) U.S. Cl.
CPC .......... *G06F 9/4856* (2013.01); *G06F 3/0647* (2013.01); *G06F 9/3851* (2013.01);
(Continued)

(58) Field of Classification Search
CPC .... G06F 9/4856; G06F 12/023; G06F 9/3851; G06F 3/0647; G06F 12/0813;
(Continued)

(56) References Cited

U.S. PATENT DOCUMENTS

| 6,282,614 B1 | 8/2001 | Musoll |
| 7,669,011 B2 | 2/2010 | Conway |
| | (Continued) | |

OTHER PUBLICATIONS

Hwang et al. "Advanced Computer Architecture: Parallelism, Scalability, Programmability", 2011, 2nd Ed., pp. 17-29, 52-53; retrieved at: https://drive.google.com/file/d/0BzQiXik0pW-IWIFpcWt6Nm5rNUU/view (Year: 2011).*

(Continued)

*Primary Examiner* — Arvind Talukdar
(74) *Attorney, Agent, or Firm* — Meyertons Hood Kivlin Kowert and Goetzel PC; Rory D. Rankin (57) ABSTRACT

Systems, apparatuses, and methods for predicting page migration granularities for phases of an application executing on a non-uniform memory access (NUMA) system architecture are disclosed herein. A system with a plurality of processing units and memory devices executes a software application. The system identifies a plurality of phases of the application based on one or more characteristics (e.g., memory access pattern) of the application. The system predicts which page migration granularity will maximize performance for each phase of the application. The system performs a page migration at a first page migration granularity during a first phase of the application based on a first prediction. The system performs a page migration at a second page migration granularity during a second phase of the application based on a second prediction, wherein the second page migration granularity is different from the first page migration granularity.

18 Claims, 6 Drawing Sheets

(51) Int. Cl.
*G06F 12/02* (2006.01)
*G06F 9/38* (2018.01)
*G06F 3/06* (2006.01)
*G06F 12/0813* (2016.01)
*G06F 12/06* (2006.01)

(52) U.S. Cl.
CPC ............ *G06F 12/023* (2013.01); *G06F 12/06* (2013.01); *G06F 12/0813* (2013.01)

(58) Field of Classification Search
CPC ...... G06F 12/06; G06F 3/0653; G06F 3/0604; G06F 9/5088; G06F 9/5066; G06F 9/505
See application file for complete search history.

(56) References Cited

U.S. PATENT DOCUMENTS

| | | | |
|---|---|---|---|
| 8,499,066 | B1 | 7/2013 | Zhang et al. |
| 10,067,709 | B2 | 9/2018 | Piga et al. |
| 10,089,014 | B2 | 10/2018 | Uppal et al. |
| 2005/0081181 | A1* | 4/2005 | Brokenshire ......... G06F 9/4862 717/100 |
| 2009/0150624 | A1 | 6/2009 | Resnick |
| 2009/0222625 | A1 | 9/2009 | Ghosh et al. |
| 2009/0271596 | A1* | 10/2009 | Barsness ............. G06F 11/3495 712/229 |
| 2010/0250856 | A1 | 9/2010 | Owen et al. |
| 2012/0023280 | A1 | 1/2012 | Lais et al. |
| 2012/0023302 | A1 | 1/2012 | Arndt et al. |
| 2012/0059983 | A1 | 3/2012 | Nellans et al. |
| 2012/0233486 | A1* | 9/2012 | Phull ...................... G06F 9/5083 713/375 |
| 2013/0036266 | A1 | 2/2013 | Naganuma et al. |
| 2014/0281299 | A1 | 9/2014 | Duluk, Jr. et al. |
| 2014/0281365 | A1 | 9/2014 | Mashey et al. |
| 2014/0365738 | A1 | 12/2014 | Hod et al. |
| 2015/0006785 | A1* | 1/2015 | Jayaraman ............ G06F 3/0611 711/103 |
| 2015/0052287 | A1* | 2/2015 | Venkatasubramanian ................... G06F 9/5033 711/6 |
| 2015/0088805 | A1 | 3/2015 | Kakarla et al. |
| 2016/0378655 | A1 | 12/2016 | Blagodurov et al. |
| 2016/0378674 | A1 | 12/2016 | Cheng et al. |
| 2017/0262216 | A1 | 9/2017 | Polkovnikov et al. |
| 2018/0074715 | A1 | 3/2018 | Farmahini-Farahani et al. |
| 2018/0307414 | A1 | 10/2018 | Smith et al. |

OTHER PUBLICATIONS

Patterson et al. "Computer Organization and Design", 2014, 5th Ed, pp. 509-510, 519-520, 531-533; (Year: 2014).*
McCreary et al., "Automatic Determination of Grain Size for Efficient Parallel Processing", 1989, pp. 1073, 1075-1076; retrieved at: https://dl.acm.org/citation.cfm?id=66454&dl=ACM&coll=DL (Year: 1989).*
Maheshwari, "Improving granularity and locality of data in multi-processor execution of functional programs", 1995, pp. 1363, 1364-1365, 1367; retrieved from: https://www.sciencedirect.com/science/article/pii/S0167819196000506 (Year: 1995).*
Kruatrachue et al., "Grain Size Determination for Parallel Processing", 1988, pp. 26-29; retrieved from: https://ieeexplore.ieee.org/document/1991/ (Year: 1988).*
Frigo, et al., "FFTW: An Adaptive Software Architecture for the FFT", Proceedings of the 1998 IEEE International Conference on Acoustics, Speech and Signal Processing, May 15, 2998, 4 pages.
Volos, et al., "BuMP: Bulk Memory Access Prediction and Streaming", in Proceedings of the 47th Annual IEEE/ACM International Symposium on Microarchitecture, Dec. 13-17, 2014, 13 pages.
Kaseridis, et al., "Minimalist Open-page: A DRAM Page-mode Scheduling Policy for the Many-core Era", Proceedings of the 44th Annual IEEE/ACM International Symposium on Microarchitecture, Dec. 3-7, 2011, 12 pages, ACM, New York, NY, USA.
Awasthi, et al., "Prediction Based DRAM Row-Buffer Management in the Many-Core Era", International Conference on Parallel Architectures and Compilation Techniques, Oct. 10-14, 2011, 2 pages.
Erlingsson, et al., "A Cool and Practical Alternative to Traditional Hash Tables", Proc. 7th Workshop on Distributed Data and Structures (WDAS'06), Jan. 2006, 6 pages.
Qiao et al., "Fast Bloom Filters and Their Generalization", IEEE Transactions on Parallel and Distributed Systems, Jan. 2014, pp. 93-103, vol. 25, Issue 1, IEEE Computer Society, Washington, D.C., USA.
Breternitz et al., "A Segmented Bloom Filter Algorithm for Efficient Predictors", Proceedings of the 2008 20th International Symposium on Computer Architecture and High Performance Computing, Oct. 29, 2008, pp. 123-130, IEEE Computer Society, Washington, D.C., USA.
Non-Final Office Action in U.S. Appl. No. 15/495,296, dated Sep. 20, 2018, 10 pages.

\* cited by examiner

FIG. 6

PREDICTING PAGE MIGRATION GRANULARITY FOR HETEROGENEOUS MEMORY SYSTEMS

BACKGROUND

Description of the Related Art

Many high-performance computing (HPC) and cloud applications operate on large distributed datasets and exhibit high levels of data-level parallelism. HPC and cloud applications are often implemented in heterogeneous memory systems (e.g., non-uniform memory access (NUMA) systems). NUMA systems are widely used in datacenters and HPC clusters as they are cost-effective and conducive for good performance in the aforementioned domains. In NUMA systems, physical memory locations are physically separated and typically associated with a processor in a single NUMA domain. Portions of work are typically run on processors in separate memory domains, causing the memory access latency to vary, with latency increasing when accessing memory in a remote domain. As a result, some accesses in the virtual address space of a process may be mapped to physically remote memory. Accesses to the remote memory must go out over the memory interconnect, thereby incurring increased latency with respect to local memory accesses and negatively impacting system performance.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for predicting page migration granularity for heterogeneous memory systems are disclosed herein. In one embodiment, a system includes at least a plurality of processing units and a plurality of memory devices. In one embodiment, each processing unit is coupled to a local memory device and one or more remote memory devices. Each processing unit is able to perform accesses to local memory with lower latency than accesses to remote memory. Accordingly, performance improves for a processing unit as more of the data accessed by the processing unit is stored in local memory rather than remote memory.

In one embodiment, the system is configured to execute a software application across the plurality of processing units. The system identifies a plurality of phases of the application based on one or more characteristics of the application. In one embodiment, a first characteristic of the one or more characteristics is a memory access pattern of the application. The system predicts which page migration granularity will improve performance for each separate phase of the application. The page migration granularity is specified as a number of pages to migrate for a given page migration. In one embodiment, performance is measured based on a number of page faults generated during the phase. For example, the fewer the number of page faults generated, the higher the performance. In one embodiment, the system performs a page migration at a first granularity during a first phase of the application based on a previous prediction. The system also performs a page migration at a second granularity during a second phase of the application based on a previous prediction, wherein the second granularity is different from the first granularity.

Figure 1:
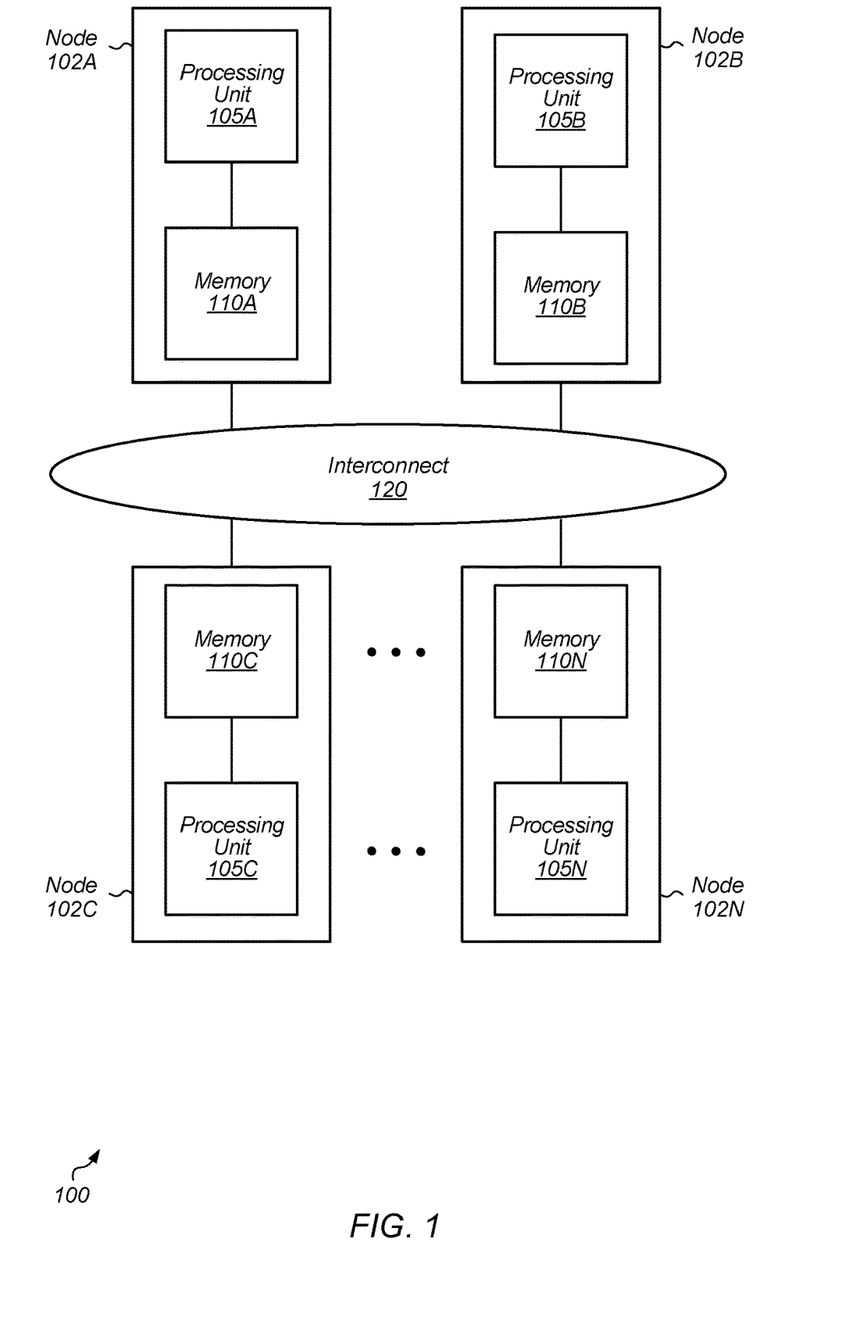
FIG. 1 is a block diagram of one embodiment of a non-uniform memory access (NUMA) computing system.

Referring now to FIG. 1, a block diagram of one embodiment of a non-uniform memory access (NUMA) computing system 100 is shown. System 100 includes processing nodes 102A-N coupled to interconnect 120. The number of nodes 102A-N in system 100 can vary from embodiment to embodiment. Each node 102A-N includes one or more processing units 105A-N coupled to one or more corresponding memory devices 110A-N. It is noted that system 100 can also be referred to as a supercomputer, data center, cluster, high performance computing (HPC) cluster, or cloud computing cluster.

Each processing unit 105A-N is representative of any number and type of processing elements (e.g., central processing unit (CPU), graphics processing unit (GPU), processor core, accelerated processing unit (APU), application specific integrated circuit (ASIC), field programmable gate array (FPGA), digital signal processor (DSP)). Each processing unit 105A-N includes any number of cores, with the number varying according to the embodiment. Processing units 105A-N can have any number and type of caches (e.g., L1 cache, L2 cache). Processor units 105A-N include circuitry for executing instructions according to a predefined instruction set. In one embodiment, the x86® instruction set architecture (ISA) is utilized by processing units 105A-N. Alternatively, the x86-64®, Alpha®, PowerPC®, MIPS®, SPARC®, PA-RISC®, ARM®, or any other instruction set architecture can be utilized by processing units 105A-N.

In one embodiment, the processing units 105A-N are configured to execute the main control software of system 100, such as an operating system. Generally, software executed by processing units 105A-N during use can control the other components of system 100 to realize the desired functionality of system 100. Processing units 105A-N can also execute other software, such as application software. Based on the architecture of system 100, a given processing unit 105A-N can access data stored in the locally connected memory more quickly than it can access data stored on a remote memory associated with another node. It is noted that the terms "application" and "process" can be used interchangeably herein.

In one embodiment, the operating system of system 100 provides a mechanism to migrate physical pages between nodes 102A-N. When migrating pages, an application's virtual address space is not altered. Rather, only the virtual to physical mapping is changed, while the virtual addresses of the migrated pages do not change. The page migration mechanism allows data to be moved closer to where the data will be used. Previously, page migration has been performed on demand, for example in response to a page fault. Additionally, previous approaches typically used a static size for page migration.

In one embodiment, system 100 is configured to select which page migration granularity to use for a given phase of a process based on a prediction of which granularity will increase performance of the given phase. It is noted that the term "page migration" is defined as moving the physical locations of one or more pages between nodes 102A-N while a process is running. When a page migration occurs, the virtual addresses that the application uses for the page(s) do not change. However, system 100 changes the physical locations and physical addresses of the page(s) as a result of the migration. The main intent of a page migration is to reduce the latency of memory access by moving page(s) near to the processor where the process accessing the memory is running.

It is noted that the term "page migration granularity" is defined as an amount of data (i.e., a number of pages) that is migrated when a page migration is initiated between memory devices. If the page migration granularity is a plurality of pages, the plurality of pages which are migrated do not have to be contiguous pages. It is also noted that the term "phase" is defined as a group of sequential instructions within a process that shares some common characteristics. For example, in one embodiment, a "phase" refers to a group of sequential instructions of a process which accesses a specific region of memory or has a specific memory access pattern. In another embodiment, a "phase" refers to a group of sequential instructions of a process which shares a specific instructions per cycle (IPC) range. In one embodiment, a phase is a sequence of events triggered by a process (e.g., an OS system call, library call, runtime software call, or otherwise), that may or may not include instructions that are inherent to the process or application itself. In addition, a phase that consists of a sequence of application or process instructions does not need to execute the instructions sequentially with respect to program order (e.g., due to loops, function calls, etc.).

Each memory 110A-N is representative of any number and type of memory devices. Various types of memories 110A-N can be utilized in system 100, including random-access memory (RAM), static RAM (SRAM), dynamic RAM (DRAM), high-speed CMOS, high-density DRAM, eDRAM, 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc.

In various embodiments, interconnect 120 can include any number and type of buses, interconnects, fabrics, or networks. For example, interconnect 120 can be implemented with one or more networks (e.g., local area network (LAN), wide area network (WAN), wireless networks, an Intranet, the Internet, storage area network (SAN)). Examples of LANs include Ethernet networks, Fiber Distributed Data Interface (FDDI) networks, and token ring networks. Interconnect 120 can also represent any type of wired or wireless connection medium. For example, wired mediums can include Ethernet, fiber channel, etc. Wireless connection mediums can include a wireless connection using a wireless communication protocol such as IEEE 802.11, a modem link through a cellular service, a satellite link, etc.

Figure 2:
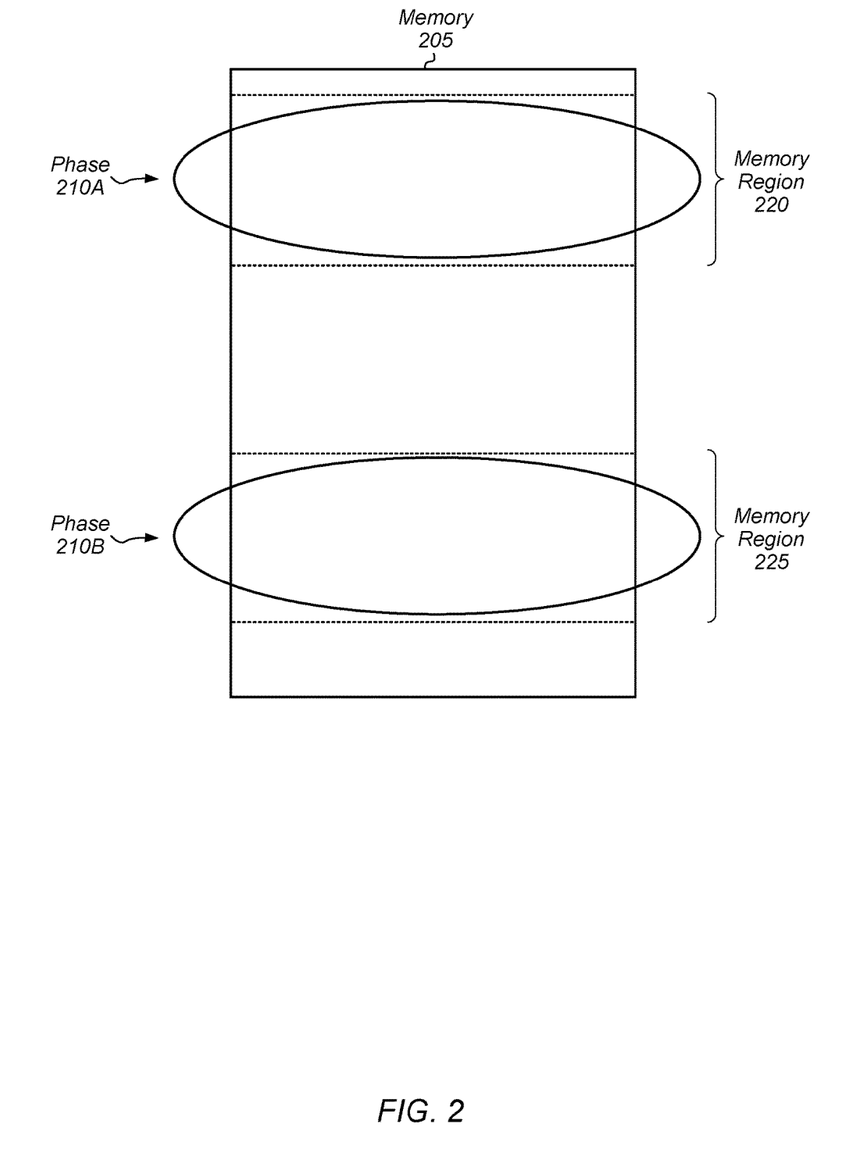
FIG. 2 is a diagram of one embodiment of a process with two phases.

Turning now to FIG. 2, a diagram of one embodiment of a process with two phases is shown. In one embodiment, the phases of a process executing on a computing system (e.g., system 100 of FIG. 1) are correlated spatially such that the phases operate on data sets with high memory location similarity. In the embodiment shown in FIG. 2, a process has two distinct phases 210A-B that can be executed many times over the process's lifetime, with each phase benefiting from different page migration granularities. It is noted that other processes can have other numbers of phases.

Each phase operates on a region of memory 205 indicated by a corresponding ellipse. For example, phase 210A operates on data within memory region 220 and phase 210B operates on data within memory region 225. As the process runs, the system tracks the memory addresses that are being accessed by the process. In one embodiment, the tracking and prediction mechanism runs in the operating system (OS) layer and samples the process's memory accesses. In one embodiment, the sampling of accesses is implemented using instruction-based sampling (IBS). Alternatively, in another embodiment, the sampling of access is implemented in OS memory page management software. The tracking and prediction mechanism can run continuously on an unused core, or the tracking and prediction mechanism can run as a daemon that periodically wakes and performs a prediction analysis. In one embodiment, the tracking and prediction mechanism makes page migration granularity predictions on a per process basis and also tracks information on a per process basis, thereby limiting interference from other processes. However, the tracked information can be stored globally and predictions can be shared. For example, in one embodiment, process IDs are hashed with memory region identifiers to gain access to the shared predictions.

In one embodiment, the tracking and prediction mechanism samples addresses on a periodic basis and masks off the low order bits so that accesses are associated with an entire memory region. The size of a region, as well as how many regions are being tracked, is programmable. In one embodiment, when the address of an access falls into an already tracked region, a counter corresponding to the tracked region is incremented. When the counter reaches a programmable threshold, a page migration granularity prediction is generated and subsequent migrations use this granularity. If no such entry exists, an entry is created and a profiling phase begins whereby the performance of the process is correlated to different page migration granularities, the best of which is chosen for the process's page migration granularity prediction. As predictions are made, the profiling phase can also continue to monitor performance and adjust prediction confidences accordingly.

It is noted that the phase tracking mechanism which tracks access patterns of the process and identifies phases can be implemented in a variety of different ways depending on the embodiment. For example, the phase tracking mechanism can be part of the operating system (OS) software, cluster computing software, application libraries, implemented in hardware, or any combination thereof. In one embodiment, bits of the addresses being accessed are masked off to associate the accesses with a memory region. When enough accesses are made to a region to generate a high confidence that the process is in a predictable phase, a page migration granularity prediction is made by the prediction mechanism and a page migration can be initiated with the predicted granularity.

Figure 3:
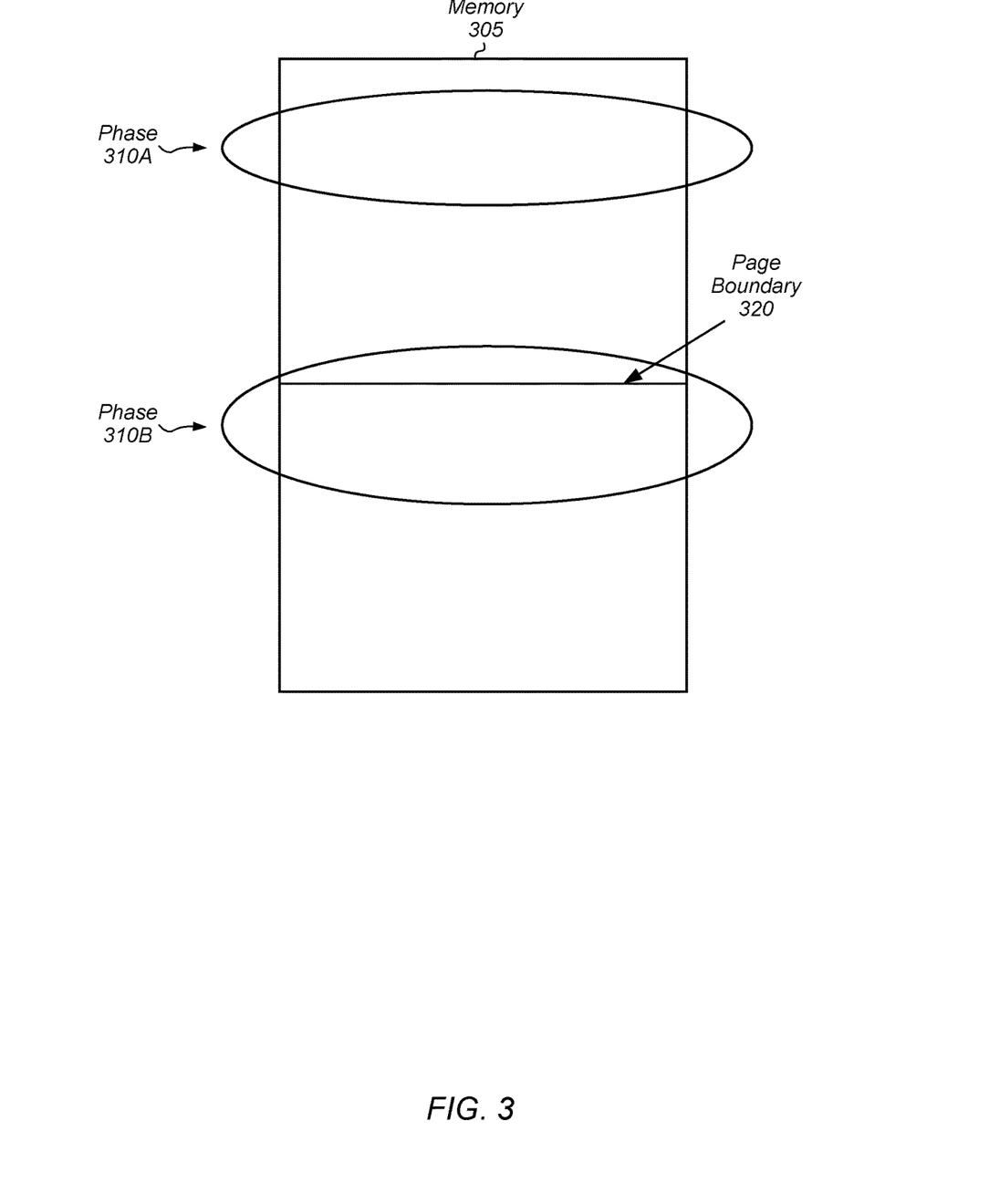
FIG. 3 is a diagram of one embodiment of tracking the page boundary proximity of accesses.

Referring now to FIG. 3, a diagram of one embodiment of tracking the page boundary proximity of accesses is shown. In one embodiment, a system (e.g., system 100 of FIG. 1) tracks the distance memory accesses are from the page boundary. In one embodiment, the distance from the beginning of the page is tracked. In another embodiment, the distance from the end of the page is tracked. In the example illustrated in FIG. 3, the process has two distinct phases where memory accesses are grouped based on their proximity to a page boundary. In addition to predicting the page migration granularity of phases 310A-B, the system can trigger a migration based on the proximity to a page boundary such that the migration completes in a timely manner.

As shown in FIG. 3, phase 310A accesses locations in memory 305 near the top of the page, and phase 310B accesses locations in memory 305 near the bottom of the page. As memory accesses are tracked, a running average of the distance to the page boundary 320 is tracked. When the distance to the page boundary 320 reaches some threshold, a page migration is triggered. This mechanism can help prevent false positives from being triggered by a process that accesses a few locations near the end of a page, but does not move sequentially toward the end of the page. A streaming application's behavior can be predicted using this mechanism as the streaming application's average end-of-page distance would be monotonically decreasing.

Figure 4:
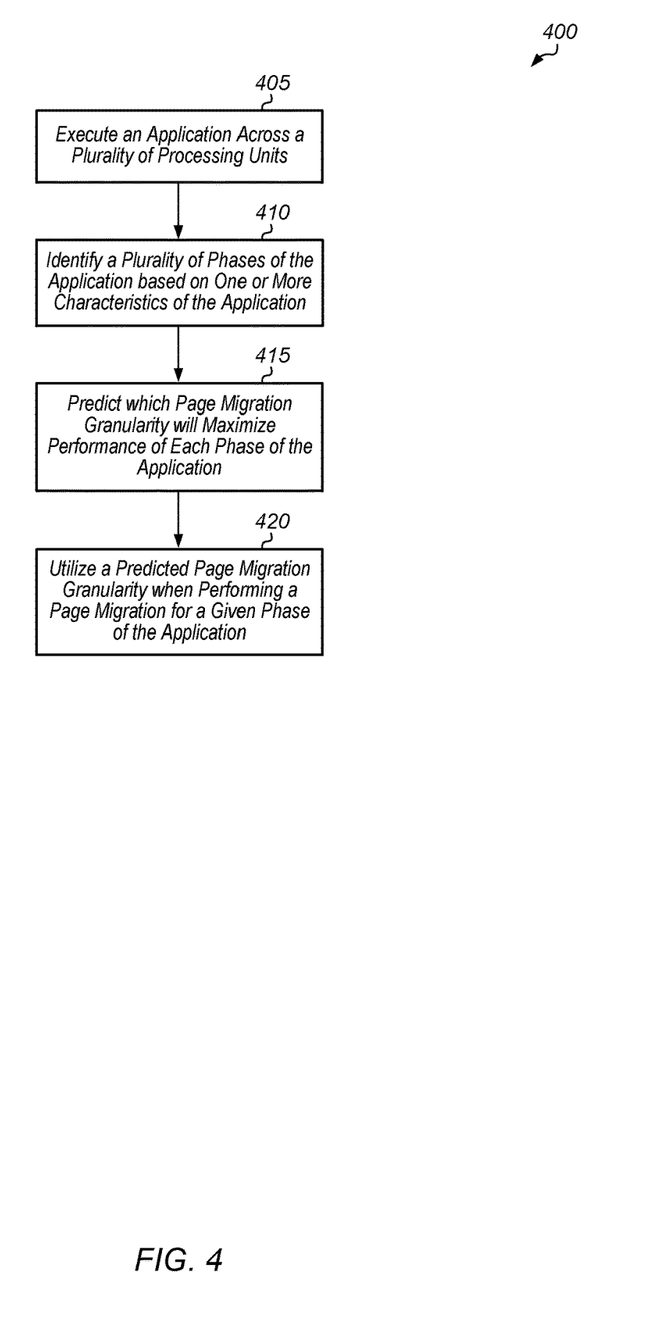
FIG. 4 is a generalized flow diagram illustrating one embodiment of a method for predicting page migration granularity for different phases of an application.
Figure 5:
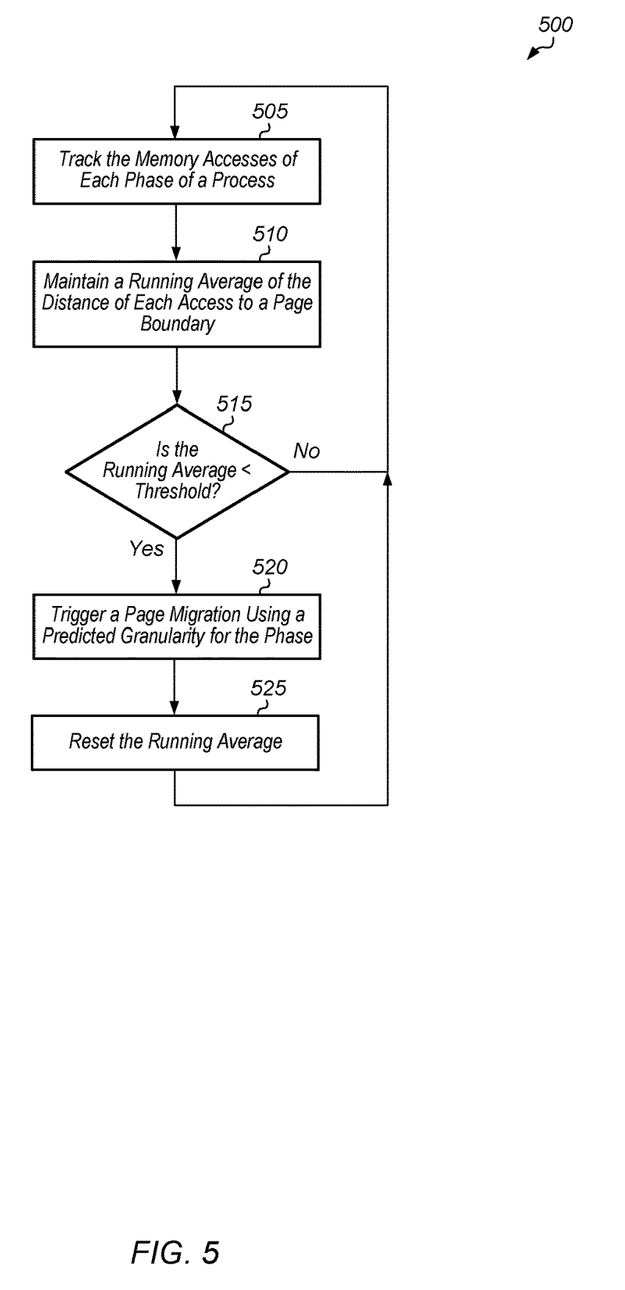
FIG. 5 is a generalized flow diagram illustrating one embodiment of a method for tracking the distance of accesses to a page boundary.
Figure 6:
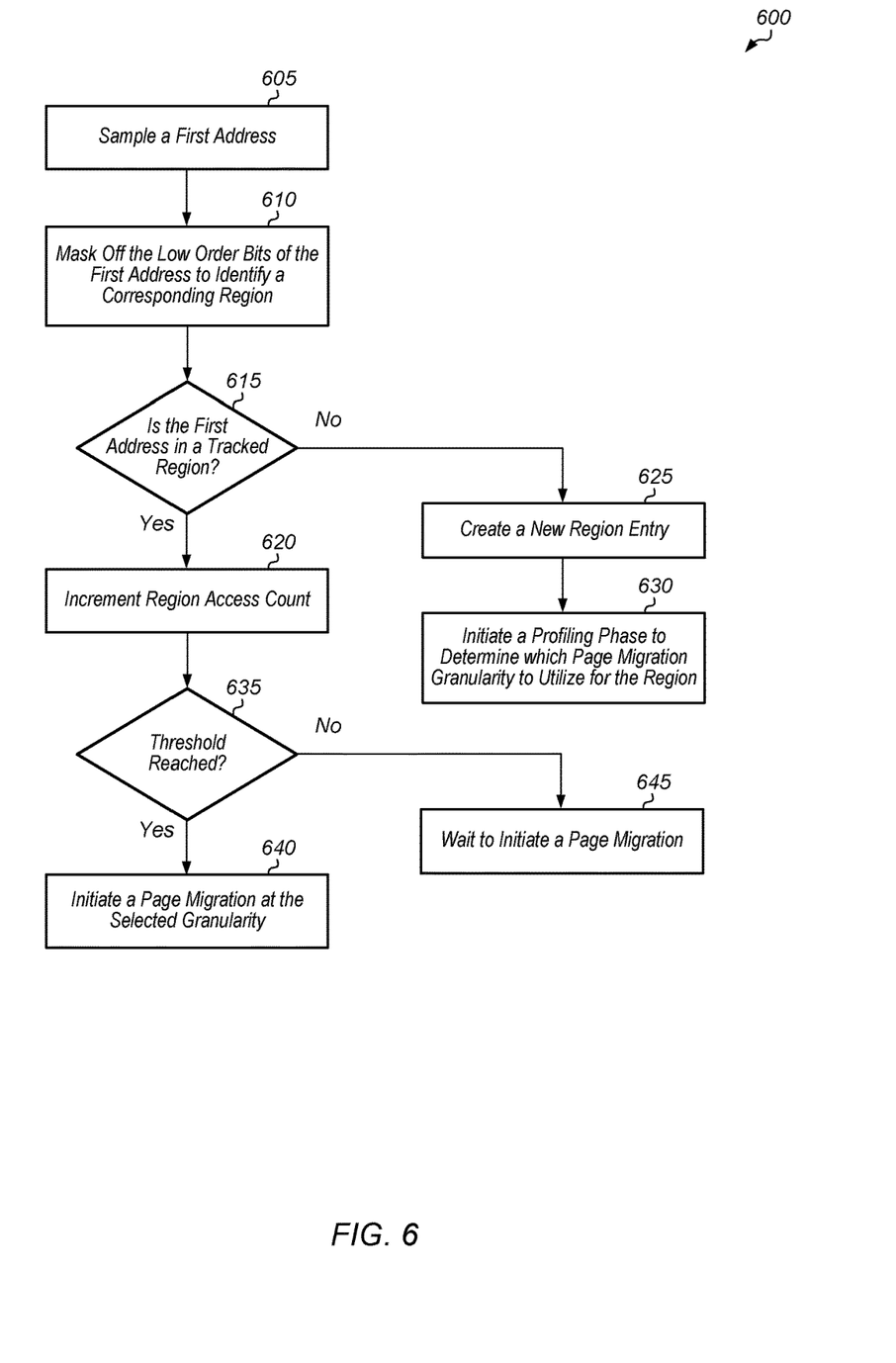
FIG. 6 is a generalized flow diagram illustrating one embodiment of a method for tracking accesses of a process.

Turning now to FIG. 4, one embodiment of a method 400 for predicting page migration granularity for different phases of an application is shown. For purposes of discussion, the steps in this embodiment and those of FIG. 5-6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 400.

A system (e.g., system 100 of FIG. 1) with a plurality of processing units and a plurality of memory devices executes an application across the plurality of processing units (block 405). The system identifies a plurality of phases of the application based on one or more characteristics of the application (block 410). The number of phases in the application can vary depending on the characteristics (e.g., memory access patterns) of the application. The system also predicts which page migration granularity will maximize performance of each phase of the application (block 415). Then, the system utilizes a predicted page migration granularity when performing a page migration for a given phase of the application (block 420). After block 420, method 400 ends.

Referring now to FIG. 5, one embodiment of a method 500 for tracking the distance of accesses to a page boundary is shown. A system tracks the memory accesses of each phase of a process (block 505). While tracking the memory accesses of each phase of the process, the system maintains a running average of the distance of each access to a page boundary (block 510). In one embodiment, the page boundary is the end of the page. In another embodiment, the page boundary is the beginning of the page.

If the running average of distance to the page boundary is less than a threshold (conditional block 515, "yes" leg), then the system triggers a page migration using a predicted granularity for the phase (block 520). If the running average of distance to the page boundary is greater than or equal to the threshold (conditional block 515, "no" leg), then method 500 returns to block 505 with the system continuing to track memory accesses. After block 520, the system resets the running average (block 525), and then method 500 returns to block 505.

Turning now to FIG. 6, one embodiment of a method 600 for tracking accesses of an application is shown. A system samples a first address accessed by an application (block 605). The system masks off the low order bits of the first address to identify a corresponding region (block 610). Then, the system determines if the first address is in a tracked region (conditional block 615). If the first address is in a tracked region (conditional block 615, "yes" leg), then the system increments the region access count for the tracked region (block 620). In another embodiment, instead of maintaining an access counter for each tracked region, the system can utilize a machine learning model to generate feature vectors and track regions being accessed by the various phases of the process. For example, in this embodiment, the machine learning model can analyze which addresses are being accessed, the sizes of the accesses, as well as other factors. Based on a statistical analysis of a plurality of inputs, the machine learning model determines how to characterize the region, predict an optimal page migration granularity, and when to initiate a page migration so as to maximize the performance of the process.

If the first address is not in a tracked region (conditional block 615, "no" leg), then the system creates a new region entry for the region (block 625). Also, the system initiates a profiling phase to determine which page migration granularity to utilize for the region (block 630). It is noted that the profiling phase can be performed offline or in real-time. It is also noted that the system can utilize performance counters, instruction based sampling, hardware event counters, and/or other mechanisms to implement the profiling phase. While implementing the profiling phase, the system measures performance of the given phase of the application for different page migration granularities. Depending on the embodiment, performance can be measured by a number of page faults, the run-time of the phase, a number of cache misses, and/or other metrics. The system can then select a page migration granularity which maximizes performance for the given phase of the application.

After block 620, the system determines if the region access count has reached a threshold (conditional block 635). If the region access count has reached a threshold (conditional block 635, "yes" leg), then the system initiates a page migration at the selected granularity (block 640). If the region access count has not reached the threshold (conditional block 635, "no" leg), then the system waits to initiate a page migration (block 645). After blocks 630, 640, and 645, method 600 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a plurality of memory devices; and
    a plurality of processing units, wherein each processing unit of the plurality of processing units is coupled to a local memory device and one or more remote memory devices;
    wherein the system is configured to:
        execute, by a processing unit comprising circuitry, an application across the plurality of processing units;
        track memory addresses being accessed by the application;
        identify a plurality of phases of the application based on an identification of a group of instructions that access a specific region of memory or exhibit a given memory access pattern;
        predict, based on the identified phases, which page migration granularity will reduce a number of page faults during each phase of the application, wherein page migration granularity refers to a number of pages to migrate when performing a given page migration; and
        move, during a given phase of the application, one or more pages from a remote memory device to a local memory device at a page migration granularity predicted to result in a reduced number of page faults for the given phase.

2. The system as recited in claim 1, wherein the system is further configured to:
    perform a page migration at a first page migration granularity during a first phase of the application based on a first prediction;
    perform a page migration at a second page migration granularity during the second phase of the application based on a second prediction, wherein the second granularity is different from the first granularity.

3. The system as recited in claim 1, wherein the system is configured to track a distance of each memory access to a page boundary.

4. The system as recited in claim 3, wherein the system is further configured to maintain a running average of a distance of memory accesses to the page boundary.

5. The system as recited in claim 1, wherein the system is configured to:
    determine a number of page faults of the given phase of the application for a plurality of different page migration granularities; and
    predict a page migration granularity for the given phase which results in a reduced number of page faults of the given phase.

6. The system as recited in claim 1, wherein the system is configured to sample memory addresses being accessed on a periodic basis and mask off one or more lower bits so that corresponding accesses are associated with a memory region.

7. A method comprising:
    executing an application across a plurality of processing units;
    tracking memory addresses being accessed by the application;
    identifying a plurality of phases of the application based on an identification of a group of instructions that access a specific region of memory or exhibit a given memory access pattern;
    predicting, based on the identified phases, which page migration granularity will reduce a number of page faults during each phase of the application, wherein page migration granularity refers to a number of pages to migrate when performing a given page migration; and
    moving, during a given phase of the application, one or more pages from a remote memory device to a local memory device at a page migration granularity predicted to result in a reduced number of page faults for the given phase.

8. The method as recited in claim 7, further comprising:
    performing a page migration at a first page migration granularity during a first phase of the application based on a first prediction;
    performing a page migration at a second page migration granularity during the second phase of the application based on a second prediction, wherein the second page migration granularity is different from the first page migration granularity.

9. The method as recited in claim 7, further comprising tracking a distance of each memory access to a page boundary.

10. The method as recited in claim 9, further comprising maintaining a running average of a distance of memory accesses to the page boundary.

11. The method as recited in claim 7, further comprising:
    determining a number of page faults of the given phase of the application for a plurality of different page migration granularities; and
    predicting a page migration granularity for the given phase which results in a a reduced number of page faults of the given phase.

12. The method as recited in claim 11, further comprising sampling memory addresses being accessed on a periodic basis and mask off one or more lower bits so that corresponding accesses are associated with a memory region.

13. An apparatus comprising:
    a processing unit comprising circuitry;
    a local memory device; and
    a remote memory device;
    wherein the apparatus is configured to:
        execute an application on the processing unit;
        track memory addresses being accessed by the application;
        identify a plurality of phases of the application based on an identification of a group of instructions that access a specific region of memory or exhibit a given memory access pattern;
        predict, based on the identified phases, which page migration granularity will reduce a number of page faults during each phase of the application, wherein page migration granularity refers to a number of pages to migrate when performing a given page migration; and move, during a given phase of the application, one or more pages from a remote memory device to a local memory device at a page migration granularity predicted to result in a reduced number of page faults for the given phase.

14. The apparatus as recited in claim 13, wherein the apparatus is further configured to:
perform a page migration at a first page migration granularity during a first phase of the application based on a first prediction;
perform a page migration at a second page migration granularity during the second phase of the application based on a second prediction, wherein the second granularity is different from the first granularity.

15. The apparatus as recited in claim 13, wherein the apparatus is configured to track a distance of each memory access to a page boundary.

16. The apparatus as recited in claim 15, wherein the apparatus is further configured to maintain a running average of a distance of memory accesses to the page boundary.

17. The apparatus as recited in claim 13, wherein the apparatus is configured to:
determine a number of page faults of the given phase of the application for a plurality of different page migration granularities; and
predict a page migration granularity for the given phase which results in a reduced number of page faults of the given phase.

18. The apparatus as recited in claim 17, wherein the apparatus is configured to sample memory addresses being accessed on a periodic basis and mask off one or more lower bits so that corresponding accesses are associated with a memory region.

* * * * *